(12) United States Patent
Ehrenberger

(10) Patent No.: US 12,467,488 B2
(45) Date of Patent: Nov. 11, 2025

(54) FLUID DISTRIBUTION METHOD FOR PRODUCING A FLUID DISTRIBUTION SYSTEM

(71) Applicant: Witzenmann GmbH, Pforzheim (DE)

(72) Inventor: David Ehrenberger, Königsbach-Stein (DE)

(73) Assignee: Witzenmann GmbH, Pforzheim (DE)

( * ) Notice: Subject to any disclaimer, the term of this patent is extended or adjusted under 35 U.S.C. 154(b) by 2 days.

(21) Appl. No.: 18/207,785

(22) Filed: Jun. 9, 2023

(65) Prior Publication Data

US 2023/0400045 A1    Dec. 14, 2023

(30) Foreign Application Priority Data

Jun. 13, 2022    (DE) .......................... 102022114845.9

(51) Int. Cl.
*F15D 1/02*    (2006.01)
*F16L 41/02*    (2006.01)

(52) U.S. Cl.
CPC .............. *F15D 1/025* (2013.01); *F16L 41/02* (2013.01)

(58) Field of Classification Search
CPC ... F16K 7/04; F16L 41/02; F16L 41/03; F16L 55/027; F15D 1/025
See application file for complete search history.

(56) References Cited

U.S. PATENT DOCUMENTS

| | | | | |
|---|---|---|---|---|
| 2,909,196 A | * | 10/1959 | Jeffreys, Jr. ........... | F16L 55/027 138/44 |
| 3,818,945 A | * | 6/1974 | Bittner ................ | B29C 66/3452 138/89 |
| 4,271,099 A | | 6/1981 | Kukla | |
| 5,057,230 A | | 10/1991 | Race | |
| 6,363,977 B1 | * | 4/2002 | Smeller ............... | F16K 31/3855 141/2 |
| 6,442,838 B1 | | 9/2002 | Mussler | |
| 9,365,304 B2 | * | 6/2016 | Mueller ................. | F16K 15/04 |
| 10,647,565 B2 | * | 5/2020 | Zumbrum ............. | A61J 1/1412 |
| 2006/0049371 A1 | * | 3/2006 | Ohnishi ................... | F16K 7/04 251/7 |

FOREIGN PATENT DOCUMENTS

| | | |
|---|---|---|
| DE | 1265513 | 4/1968 |
| DE | 202008014269 | 3/2009 |
| DE | 102013226606 | 7/2015 |
| FR | 2871871 B1 | 12/2005 |

* cited by examiner

*Primary Examiner* — Umashankar Venkatesan
(74) *Attorney, Agent, or Firm* — Volpe Koenig

(57) ABSTRACT

A fluid distribution system (1) having a main distribution line (2) and a number of branch lines (7), which branch lines (7) branch off in each case from the main line (2). A throttle device (8) is arranged in at least one branch line (7), and the throttle device (8) is formed by at least a local deformation of the relevant branch line (7). A method for producing such a fluid distribution system (1) is likewise provided.

16 Claims, 3 Drawing Sheets

FLUID DISTRIBUTION METHOD FOR PRODUCING A FLUID DISTRIBUTION SYSTEM

CROSS-REFERENCE TO RELATED APPLICATIONS

This application claims priority from German Patent Application No. 10 2022 114 845.9, filed Jun. 13, 2022, which is incorporated herein by reference as if fully set forth.

TECHNICAL FIELD

The invention relates to a fluid distribution system having a main distribution line and a number of branch lines, which branch lines branch off in each case from the main line, in the case of which a throttle device is arranged in at least one branch line.

The invention furthermore relates to a method for producing a fluid distribution system composed of a main distribution line and a number of branch lines, which branch lines branch off in each case from the main line, in particular of the fluid distribution system according to the invention.

BACKGROUND

In previously known fluid distribution systems, for example, in cooling circuits with several locations for cooling of structural elements or components, throttle devices or throttles in the form of separate, individualized parts are realized, which parts have to be correspondingly planned, installed and subsequently tested. Such throttles are necessary to control a flow of fluid, for example, a cooling fluid, in the fluid distribution system to the stated structural elements or components in a suitable manner.

The individualization of the individual parts prevents a per se desirable use of identical parts and thus increases the costs for the production of the fluid distribution system as a result of low piece numbers and complexity during mounting.

SUMMARY

The object on which the invention is based is to provide a throttle function in the branches or branch lines of a fluid distribution system, wherein a simplification of production and a corresponding cost advantage should be achieved as a result of the use of identical parts in planning, procurement and mounting.

The object is achieved according to the invention by a fluid distribution system with one or more of the features disclosed herein as well as by a method for producing a fluid distribution system with one or more of the features disclosed herein.

Advantageous further developments of the invention are defined below and in the claims.

According to the invention, a fluid distribution system having a main distribution line and a number of branch lines, which branch lines branch off in each case from the main line, in the case of which a throttle device is arranged in at least one branch line, is characterized in that the throttle device is formed by at least a local deformation of the relevant branch line.

According to the invention, a method for producing a fluid distribution system composed of a main distribution line and a number of branch lines, which branch lines branch off in each case from the main line, in particular of the fluid distribution system according to the invention, is characterized in that, in at least one branch line, a throttle device is deformed by at least a local deformation of the relevant branch line.

It is accordingly proposed in the context of the present invention to provide a throttle function in the case of a fluid distribution system, which fluid distribution system is formed substantially from what is known as a main pipe (MP) or main distribution line and drop lines connected to the main pipe, i.e. branch lines, in that the stated throttle or throttle device is realized individually by local deformation, in particular by mechanical action on the respective drop line (DL).

It is in this manner in particular possible to manufacture the fluid distribution system using identical drop lines (branch lines) and where necessary form a respective throttle after the manufacture of the actual fluid distribution system depending on the desired requirement.

In this case, the throttle or throttle device can have individual characteristics in a respective branch line at a corresponding position along the main distribution line, for example, by variation of the respective indentation depth and length, in particular in the context of the mechanical action stated by way of example.

The terms "throttle" and "throttle device" are used here and below as synonyms.

The stated individual characteristics of the throttle device(s) preferably reflect a loss in pressure which is relevant for the equal distribution of a mass flow in the fluid distribution system at or in the relevant throttle device.

The above-mentioned preferred mechanical action to create the local deformation can be performed by the pushing in of one or more tool or stamp geometries which are arranged or can be arranged preferably symmetrically over the circumference of the relevant branch line so that a preferably star-shaped pipe cross-section of the branch line is produced.

The stated star shape of the pipe cross-section preferably has more than two points, most preferably three or four points. One advantage of the star geometry is the reduction in the hydraulic diameter for the required loss in pressure alongside simultaneously optimal maintenance of the geometrical moment of inertia and thus the rigidity of the overall construction.

The following configurations of the device according to the invention or method according to the invention are listed in the subordinate claims and have been shown to be particularly advantageous:

As has already been stated, it can be provided in a further development of the fluid distribution system according to the invention that the deformation, i.e. the local deformation for creating the throttle device, was generated by mechanical action on the branch line, preferably by action from the outside on the branch line. A corresponding process can be realized particularly easily and thus at low cost.

Another further development of the fluid distribution system according to the invention provides that the deformation includes a cross-sectional change, in particular cross-sectional narrowing. As a result of this, a particular simple possibility is provided to achieve an intentional throttle action and adapt it to a given requirement.

Once again in the course of another further development of the fluid distribution system according to the invention, it can furthermore be provided that the deformation comprises at least a maximal deformation depth, in particular indentation depth, and a deformation length, in particular indentation length. A desired loss of pressure in the relevant branch line can be effectively and easily adjusted via the deformation depth and/or the deformation length.

Yet another further development of the fluid distribution system according to the invention provides that a multiplicity of branch lines, preferably all branch lines, are formed identically, with the exception of the respective deformation, in particular in terms of their respective cross-section. The production of the fluid distribution system is in this manner particularly simple because a large number of identical parts can be used for the branch lines. Adjustment to a specific use or requirement is performed solely by the individualization of the respective deformations.

Another further development of the fluid distribution system according to the invention again provides that the deformation of the relevant branch line is designed in an individualized manner at each branch line, e.g. in terms of length, depth and/or cross-section, in order to control a mass flow of a consumer connected or to be connected to the respective branch line.

It has been shown to be particularly advantageous if, in the case of a corresponding further development of the fluid distribution system according to the invention, the deformation is formed in a cross-section through the relevant branch line in a point-symmetrical manner in relation to a center point of the branch line, in particular in a star-shaped manner with a star shape. Such a configuration has been shown to be expedient in particular in terms of the mechanical resistance of the fluid distribution system.

It is particularly advantageous in this context if, in the case of a corresponding further development of the fluid distribution system according to the invention, in the case of a star-shaped configuration of the branch line, the star shape has at least three points, preferably four points.

A configuration of the fluid distribution system according to the invention has been shown to be particularly expedient in practice, in the case of which the points are arranged symmetrically over a circumference of the branch line.

In order to further improve the usability of the fluid distribution system according to the invention, it can also be provided in the case of a corresponding further development that the branch line is arranged between the main distribution line and a preferably at least partially corrugated line element which proceeds from the main distribution line. The branch line then substantially "only" serves to form the throttle device and to connect the stated line element to the main distribution line. If the line element is formed to be at least partially corrugated, in particular in the manner of an (annular) corrugated hose or a bellows, in particular manufacturing tolerances and tolerances induced by temperature as well as vibrations can easily be compensated for or absorbed during operation.

In the case of yet another further development of the fluid distribution system according to the invention, the branch line can be inserted with its one end into an opening or into an extrusion in the main distribution line, and the line element can be inserted into another end of the branch line. In this manner, a particularly simple and process-reliable structure of the fluid distribution system is produced.

In the course of a further development of the method according to the invention, as was noted above, it can be provided that the deformation, i.e. the local deformation of the branch line for the purpose of the formation of the throttle device, is performed by mechanical pushing in of the branch line from the outside, preferably by means of a suitable push-in tool, most preferably in the case of simultaneous support of the branch line from the inside. Such a process is particularly simple and low-cost.

In the course of a further development of the method according to the invention, it can also be provided that, in order to produce the fluid distribution system, several branch lines are used which are or were formed to be substantially identical prior to the deformation, in particular in terms of their respective cross-section. The corresponding advantages have already been pointed out.

Another possible further development of the method according to the invention provides that the branch line is already deformed prior to a connection to the main distribution line in order to produce the throttle device.

The method according to the invention in the case of a corresponding further development is, however, particularly advantageous if the branch line is only deformed after a connection to the main distribution line. The fluid distribution system can then be prefabricated, and is only adapted on site in terms of the desired pressure losses.

It has likewise been shown to be particularly advantageous if, in a further development of the method according to the invention, prior to the deformation, a further line element, preferably an at least partially corrugated line element, in particular an (annular) corrugated hose or bellows, is inserted into a free end of the branch line and preferably fastened in a firmly bonded manner to the branch line, for example, by welding, gluing or soldering.

The method according to the invention in the case of a corresponding further development is also very preferably advantageous if the deformation of the relevant branch line is performed in an individualized manner in terms of its characteristics, e.g. in terms of depth, length and/or type of deformation, at each branch line in order to control a mass flow of a consumer connected to the respective branch line.

In the course of the present invention, in particular the advantages listed below can be realized which are expressed in simplified and thus lower cost production: Use of identical parts (in particular for the branch lines), individualization of the throttle devices only after mounting and the joining process, no risk of confusion, no separate structural elements.

It is furthermore possible to perform the process for producing the throttle devices in what is known as a (process) auxiliary time, for example, parallel to alignment after soldering if, for example, the branch lines and/or the stated further line element are connected to one another or to the main distribution line by a soldering process.

BRIEF DESCRIPTION OF THE DRAWINGS

Further properties and advantages of the invention will become apparent from the following description of exemplary embodiments on the basis of the drawing.

DETAILED DESCRIPTION

Figure 1:
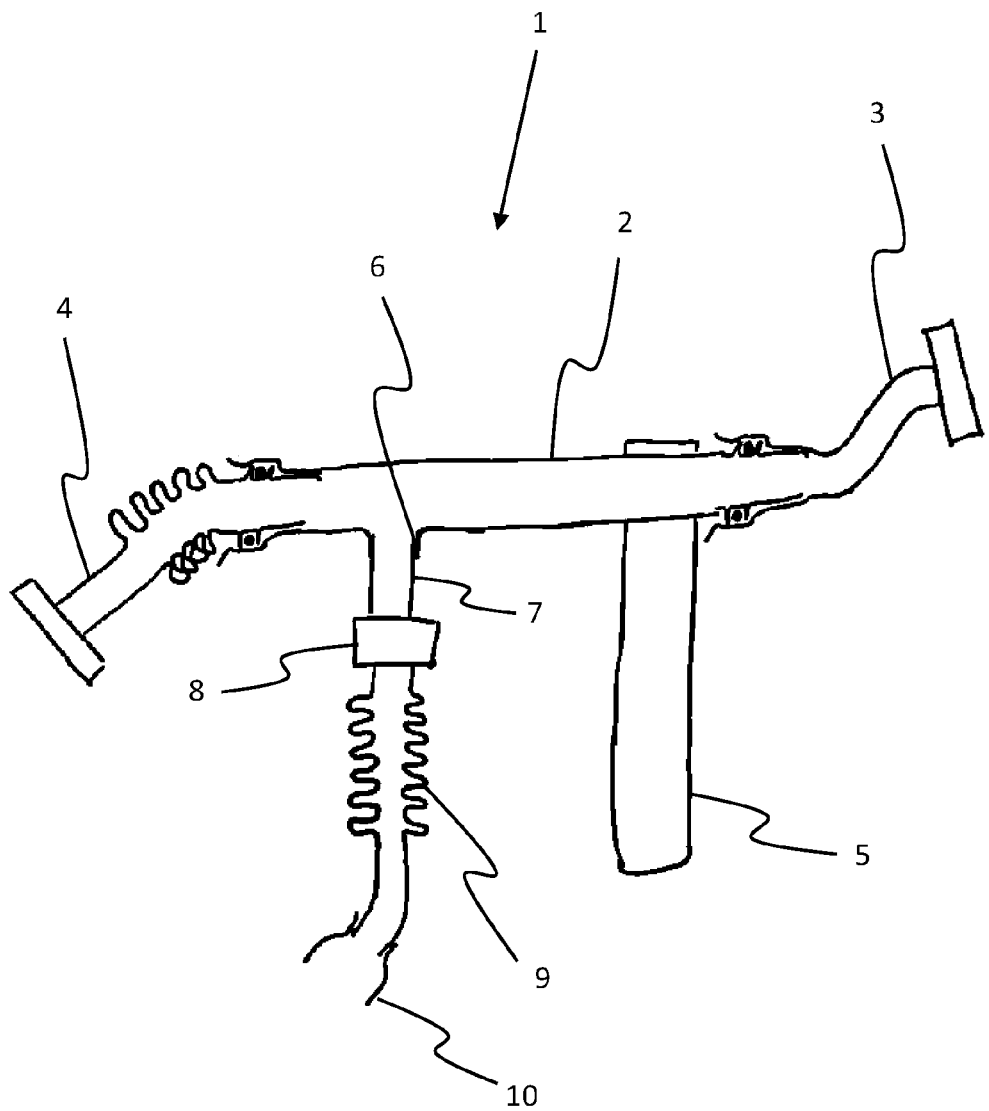
FIG. 1 shows a schematic overall representation of a previously known fluid distribution system.

A schematic overall representation of a previously known fluid distribution system is shown in FIG. 1. The previously known fluid distribution system nevertheless corresponds to a fluid distribution system according to the invention with the exception of the throttle device still to be described.

The fluid distribution system is designated overall in FIG. 1 by the reference number 1. It comprises in the case of reference number 2 what is known as a main pipe which represents a main distribution line of the fluid distribution system 1. Certain connecting pieces 3, 4 are connected terminally to the main pipe or main distribution line 2, which connecting pieces 3, 4 serve to connect the main pipe or main distribution line 2 to further (line) elements, which is not represented further in FIG. 1. Reference number 5 designates a holding element for holding or fastening the fluid distribution system 1, in particular the main pipe or main distribution line 2.

In the case of reference number 6, the main pipe or main distribution line 2 has an extrusion into which a branch line 7 is inserted. The branch line 7 can be connected to the main distribution line 2 in particular in a firmly bonded manner, for example, soldered. Reference number 8 designates a separate throttle device which is arranged on the branch line 7 in order to control the throughflow of a fluid, for example, of a cooling fluid. A further line element 9 adjoins the throttle device 8, which line element 9 is formed in the present case as bellows. On the other hand, the further line element 9 is connected to a further element 10, which can involve, for example, a connecting part for connecting the branch line 7 or the further line element 9 to a battery module which is to be subject to temperature control of an electrically driven motor vehicle in order to supply, for example, the battery module with cooling fluid.

As already mentioned in the introductory part of the description, it has been shown to be disadvantageous if the throttle device 8 is formed as a separate structural element. The present invention is of assistance here, as is represented by way of example in greater detail below on the basis of FIGS. 2 and 3.

Figure 2:
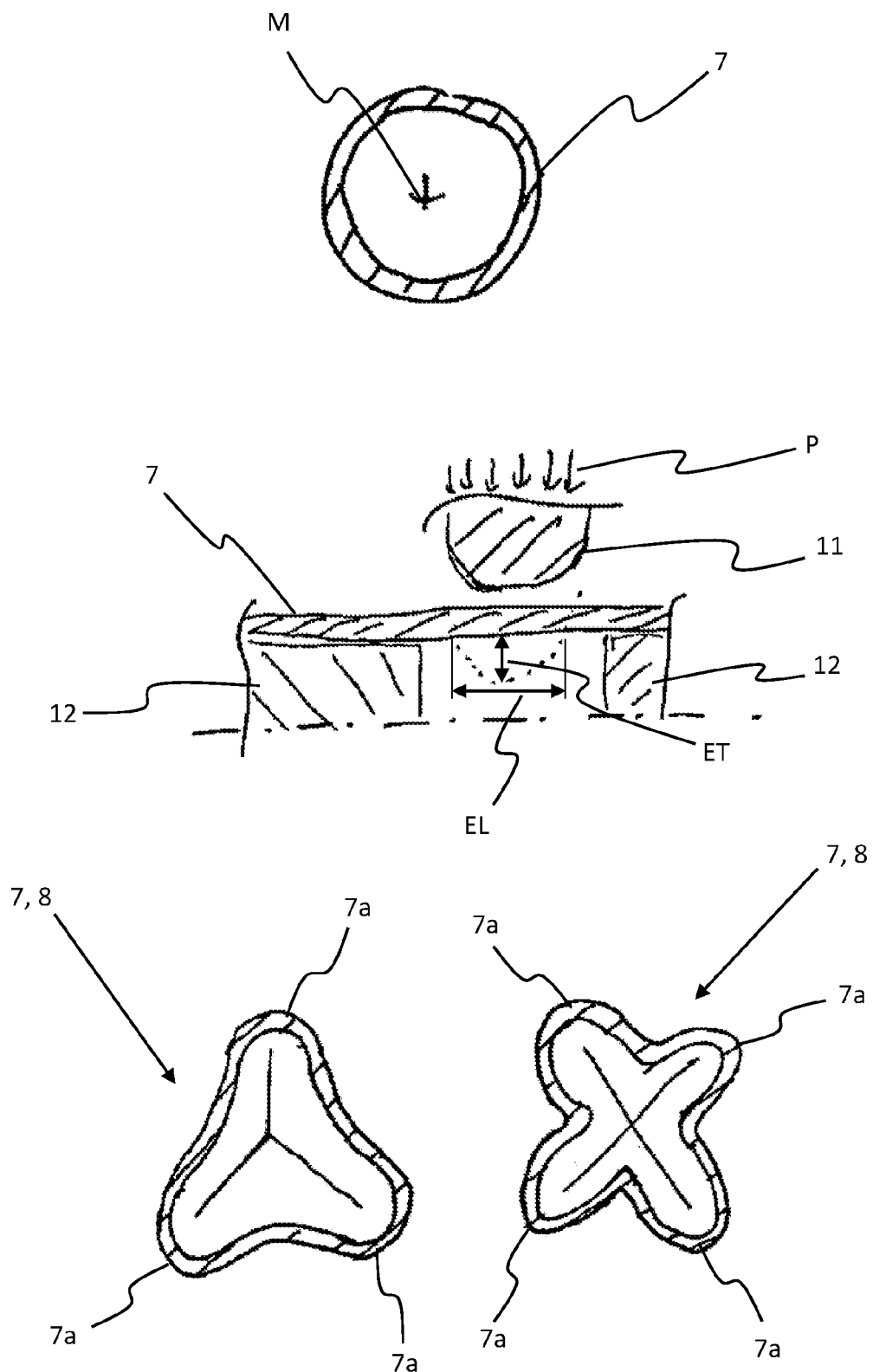
FIG. 2 schematically shows a production according to the invention of a throttle device for a fluid distribution system, in particular analogous to FIG. 1.

FIG. 2 illustrates how, in the case of a pipeline element which can involve in particular the branch line 7 according to FIG. 1, a throttle or a throttle device 8 is produced by local deformation by means of the action of pressure from the outside.

At the very top in FIG. 2, the branch line 7 or the entire pipeline element is represented in cross-section before the throttle or throttle device was produced. In the undeformed state, the branch line 7 or the stated pipeline element corresponding preferably possesses a circular cross-section.

In the center of FIG. 2 it is represented in a longitudinal section how action is performed by means of a suitable push-in tool 11 in the direction of the arrows P from the outside on the branch line 7 or the stated pipeline element in order to locally deform it and produce the throttle or throttle device. Reference number ET designates the (maximum) indentation depth, and reference number EL designates the indentation length. Reference number 12 designates a counter tool for support of the branch line 7 or the stated pipeline element during deformation.

As can be inferred from the representation at the bottom in FIG. 2, the push-in tool 11 is preferably formed in such a manner that, in relation to a center point M of the branch line 7 or the stated pipeline element, it acts distributed symmetrically over its circumference on the branch line 7 or the stated pipeline element. In the case of a corresponding configuration of the push-in tool 11, in particular the star shapes shown can be realized in the region of the local deformation of the branch line 7 or the stated pipeline element, wherein the left star shape (Y) has three points 7a and the (alternative) right star shape (X) has four points 7a.

The points 7a are preferably formed or arranged distributed in each case evenly over the circumference of the branch line 7 or the stated pipeline element. As a result of this, the throttle device 8 is created in the deformation region (cf. FIGS. 1 and 3).

Figure 3:
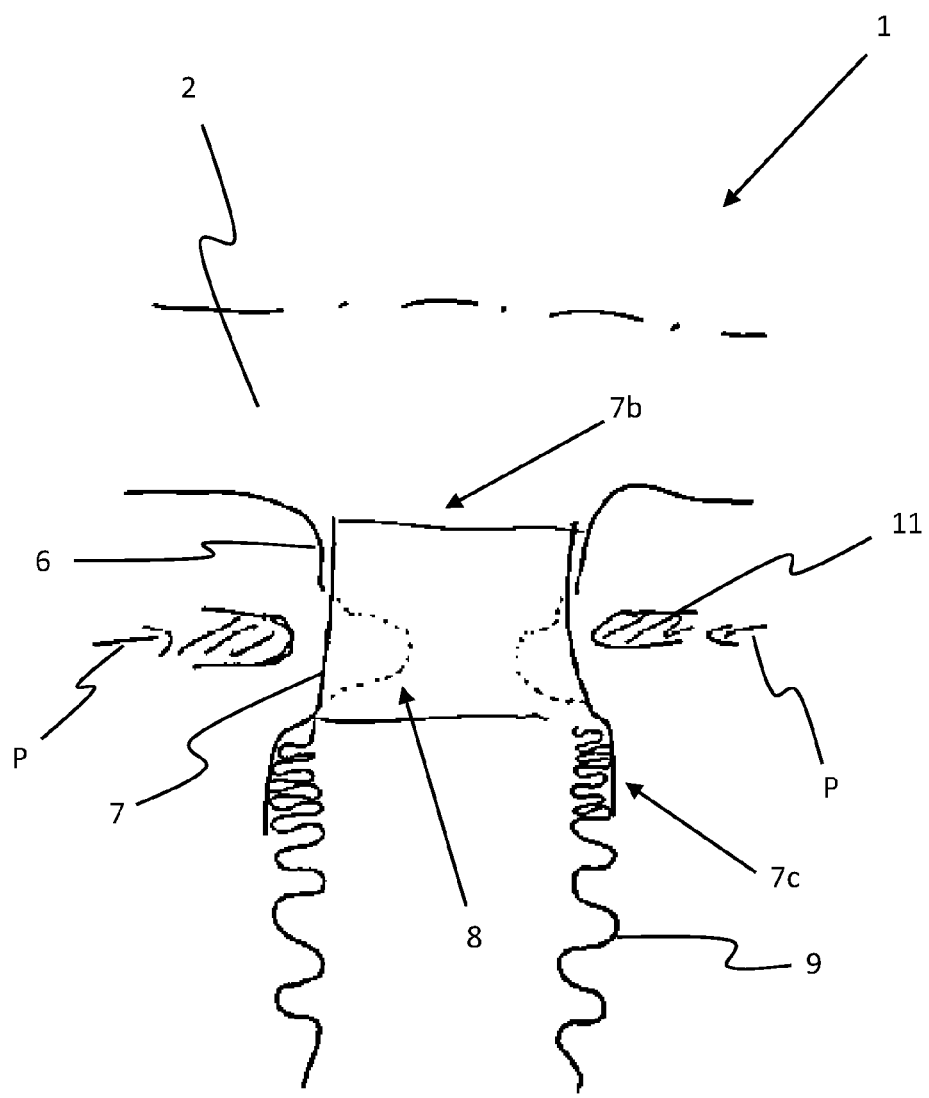
FIG. 3 shows in detail a configuration of a fluid distribution system according to the invention.

FIG. 3 shows a section through a fluid distribution system 1 according to the invention, wherein identical reference numbers designate the same elements or elements with at least the same effect as in FIGS. 1 and 2.

The branch line 7 which is relatively short here is inserted with one end 7b in the region of the extrusion 6 into the main pipe or main distribution line 2 and fixed there preferably in a firmly bonded manner. At its other end 7c, the branch line 7 has a widening into which a further line element 9 in the form of a corrugated hose is inserted. The corrugated hose can be connected in a non-positive manner to the branch line 7 in particular by injection. Additionally or alternatively, a firmly bonded connection is also considered here.

In the case of a correspondingly prefabricated fluid distribution system 1, as an initially last step of manufacture, the throttle device 8 already mentioned several times is preferably formed by local deformation of the branch line 7. A suitable push-in tool 11 is in turn preferably used for this purpose, which push-in tool 11 acts according to the arrows P circumferentially from the outside on the branch line 7 so that the contour plotted by a dashed line in FIG. 3 is produced which forms the throttle device 8.

If the fluid distribution system 1 has further extrusions 6 (not shown in FIG. 3), a corresponding approach can be taken there. In this manner, the throttle devices 8 can be configured and adapted individually.

The invention claimed is:

1. A fluid distribution system (1), comprising:
   a main distribution line (2);
   a plurality of branch lines (7), said branch lines (7) branch off in each case from the main line (2); and
   a plurality of throttle devices (8), each said throttle device (8) being arranged in one of the respective branch lines (7) of the plurality of branch lines (7),
   wherein each throttle device (8) is formed by at least a local, permanent deformation of the respective branch line (7);
   wherein each local deformation is formed in an individualized manner on said respective branch line (7) that includes a respective one of the throttle devices (8) of the plurality of throttle devices (8); and
   wherein each throttle device (8) is formed to have individual characteristics, in the respective branch line (7) at a corresponding position of the respective branch line (7) along the main distribution line (2), by variation of at least one of a deformation depth or length, to control a mass flow to a consumer connected or adapted to be connected to the respective branch line (7).

2. The fluid distribution system (1) as claimed in claim 1, wherein each local deformation is formed by mechanical action on the respective branch line (7) from an outside of each respective branch line (7).

3. The fluid distribution system (1) as claimed in claim 1, wherein each local deformation includes a cross-sectional change to the respective branch line (7).

4. The fluid distribution system (1) as claimed in claim 1, wherein each local deformation comprises at least a maximal deformation depth and a deformation length.

5. The fluid distribution system (1) as claimed in claim 1, wherein the plurality of branch lines (7) are formed identically in terms of respective cross-sections thereof, except for the local deformations.

6. The fluid distribution system (1) as claimed in claim 1, wherein each local deformation is formed in a cross-section of the respective branch line (7) in a radially symmetrical manner about a center point (M) of the cross-section of the respective branch line (7).

7. The fluid distribution system (1) as claimed in claim 6, wherein each local deformation forms a star-shaped configuration of the cross-section of the respective branch line (7), and the star shape has at least three points (7a).

8. The fluid distribution system (1) as claimed in claim 7, wherein the points (7a) are arranged symmetrically over a circumference of the respective branch line (7).

9. The fluid distribution system (1) as claimed in claim 1, wherein the respective branch lines (7) of the plurality of branch lines (7) that have the respective throttle device (8) are arranged between the main distribution line (2) and respective line elements (9) which proceeds away from the main distribution line (2).

10. The fluid distribution system (1) as claimed in claim 9, wherein the respective branch lines (7) of the plurality of branch lines (7) that have the respective throttle devices (8) are inserted with one end (7b) into an opening or into an extrusion (6) in the main distribution line (2), and the respective line element (9) is inserted into another end (7c) of the respective branch line (7).

11. A method for producing a fluid distribution system (1) comprised of a main distribution line (2) and a plurality of branch lines (7), said branch lines (7) branching off in each case from the main line (2), the method comprising:
- connecting the plurality of branch lines (7) to the main line (2), and
- forming at least one throttle device (8) in at least one of the branch lines (7) by at least locally, permanently deforming the at least one branch line (7),
- wherein connecting the at least one branch line (7) that is to be deformed occurs prior to forming the at least one throttle device (8).

12. The method as claimed in claim 11, wherein the deforming is carried out by mechanical pushing in of the branch line (7) from an outside.

13. The method of claim 12, further comprising supporting the at least one branch line (7) from an inside thereof, wherein the supporting occurs simultaneously with forming the at least one throttle device (8).

14. The method as claimed in claim 11, wherein the plurality of the branch lines (7) are individually connected to the main line (2) and subsequently individually deformed, the plurality of the branch lines (7) having substantially identical cross-sections prior to being deformed.

15. The method as claimed in claim 11, further comprising inserting a further line element (9) into a free end (7c) of the at least one branch line (7) prior to the deforming.

16. The method as claimed in claim 11, wherein a plurality of the branch lines (7) are deformed, and the deforming of each said respective branch line (7) is carried out in an individualized manner at each said branch line (7) in order to control a mass flow to a consumer connected to the respective branch line (7).

* * * * *